United States Patent [19]

Beck

[11] Patent Number: 6,105,832
[45] Date of Patent: Aug. 22, 2000

[54] HIGH SPEED, NO STRINGING, HOT MELT ADHESIVE DISPENSING HEAD

[76] Inventor: James L. Beck, 125 George St., Tarpon Springs, Fla. 34689

[21] Appl. No.: 09/307,188

[22] Filed: May 7, 1999

Related U.S. Application Data

[60] Provisional application No. 60/085,048, May 11, 1998.

[51] Int. Cl.[7] .................................................. B05B 15/02
[52] U.S. Cl. ..................... 222/571; 222/148; 251/325; 239/119; 239/586
[58] Field of Search .................................... 222/571, 148, 222/518; 251/321, 325, 353; 239/119, 106, 586

[56] References Cited

U.S. PATENT DOCUMENTS

| | | | |
|---|---|---|---|
| 4,119,058 | 10/1978 | Schmermund | 222/571 |
| 4,516,702 | 5/1985 | Schmidt | 222/571 |
| 5,429,304 | 7/1995 | Tomita et al. | 239/119 |
| 5,720,433 | 2/1998 | Forker | 239/119 |
| 5,794,825 | 8/1998 | Gordon et al. | 222/518 |

*Primary Examiner*—Kevin Shaver
*Assistant Examiner*—Eric Keasel
*Attorney, Agent, or Firm*—Woodard, Emhardt, Naughton Moriarty & McNett

[57] ABSTRACT

It is therefore an object of the present invention to provide a valve assembly of the general class aforedescribed having the capability of drawing-back the flow of product from the nozzle after valve closing, in a more accurate and precise manner, requiring few moving parts, without the need of external sources for moving any of the parts, and in a manner which automatically closes the discharge and thereafter creates the suck-back flow.

6 Claims, 2 Drawing Sheets

HIGH SPEED, NO STRINGING, HOT MELT ADHESIVE DISPENSING HEAD

This application claims the benefit of U.S. Provisional No. 60/085,048 filed May 11, 1998.

TECHNICAL FIELD OF THE INVENTION

The invention relates to a dispenser head for flowable materials, particularly viscous materials and liquids, and in particular to such a dispenser head incorporating a shut-off valve providing a suck-back action.

BACKGROUND OF THE INVENTION

In many applications for dispensing of flowable materials and liquids, it is required to be able to start and stop the dispensing action many times. Many dispensers or applicators of flowable materials provide some form of shut-off valve, but these are often of only limited application. In many cases, the valves in such dispensers are not efficient even working under optimum conditions. Even after the valves are shut off, residues of material will cling to the nozzle, or drip onto the workpiece or machinery. With thicker, more viscous materials or liquids, the problem becomes more aggravated. With many designs of shut-off valves, even after the valve has been closed, the material or liquid strings out from the nozzle, or clings to the nozzle, resulting in the placement of an inaccurate deposit of the material on the workpiece, or leaving material stringing from the dispensing head to the machinery or to the workpiece, in places where it is not required.

While a wide variety of viscous materials and liquids may require dispensing in this way, the dispensing of adhesives and bonding agents presents these problems in a particularly acute form. More specifically, in some high-volume, high-speed gluing systems, some build-up of glue on and about the nozzle or outlet of the dispenser or applicator member has been experienced. While this may be corrected by physical wiping or cleaning by an operator, it is quite difficult to correct this condition while the gluing system is in operation. At the relatively high speeds at which most systems are operated, it is quite difficult for an operator to physically wipe or otherwise clean the dispensing applicator or nozzle without interfering with the relatively high speed dispensing of glue thereby. However, it is also undesirable to shut down a relatively high speed, and highly efficient gluing system and attendant article handling lines and equipment at frequent intervals to achieve such cleaning or wiping operations.

Valve or nozzle assemblies of the general class herein, having a suck-back valve or draw-back capability after closing the discharge, include some type of discharge valving, and a chamber downstream thereof in communication with the nozzle for effecting a suck-back flow of liquid from the nozzle upon an increase in volume in the chamber. The simplest approach includes the use of a hand-operated plunger which forces the liquid, such as an adhesive, out of a discharge nozzle from an adjoining chamber containing the liquid, and subsequent retraction of the plunger drawsback product from the nozzle to prevent product extrusion from the nozzle tip after a predetermined amount is dispensed or applied to a workpiece. This has proven largely ineffective for accurately cutting off the flow of product through the nozzle for liquids of different viscosities, and is obviously unsuitable for large scale dispensing operations. Other valve arrangements provide for a more precise cutting off of the flow of product from the nozzle after a closing of the discharge valve. However, many of such arrangements require relatively movable parts to effect a suck-back flow from the nozzle, or separate elements for closing the discharge and thereafter creating the suck-back flow. Otherwise, external means are required for carrying out the discharge closing and/or draw-back operations. These various prior art approaches thus require numerous parts and external functions which add to the complexity and cost of the valve arrangement and are more cumbersome to operate.

SUMMARY OF THE INVENTION

It is therefore an object of the present invention to provide a valve assembly of the general class aforedescribed having the capability of drawing-back the flow of product from the nozzle after valve closing, in a more accurate and precise manner, requiring few moving parts, without the need of external sources for moving any of the parts, and in a manner which automatically closes the discharge and thereafter creates the suck-back flow.

In one form of the present invention a dispensing head is disclosed, comprising a valve body having a longitudinal body passageway formed therethrough between a distal end and a proximal end, the body passageway having a first section at the distal end having a first diameter and a second section at the proximal end having a second, smaller diameter, and an annular shoulder therebetween, the valve body further having a trigger inlet passageway at the distal end communicating with the first section; a dispensing liquid inlet tube formed through the valve body and communicating with the second section; a spring disposed within the body passageway first section and abutting the annular shoulder; and a spool valve/piston assembly disposed within the body passageway and extending through the spring, the spool valve/piston assembly comprising a spool valve head formed at a proximal end of the spool valve/piston assembly and disposed within the second section, the spool valve head including a valve head passageway formed through a central, longitudinal axis of the spool valve head; a channel formed from an exterior surface of the spool valve/piston assembly to the valve head passageway for fluid communication therebetween; a first seal disposed around the spool valve/piston assembly and having the second diameter, the first seal located between the spool valve head and the spring; and a second seal disposed around the spool valve/piston assembly and having the first diameter, the second seal located between the spring and the trigger inlet passageway; wherein application of gas pressure to the trigger inlet passageway moves the spool valve/piston assembly in the proximal direction against the spring bias force, thereby aligning the channel with the dispensing liquid inlet tube, allowing dispensing liquid to enter the valve head passageway; and wherein removing the gas pressure from the trigger inlet passageway allows the spring bias force to move the spool valve/piston assembly in the distal direction, blocking the dispensing liquid inlet tube with the spool valve head and creating a cavity in the second section proximal of the spool valve head operative to suck back any dispensing liquid away from the proximal end of the valve body.

DETAILED DESCRIPTION OF THE PREFERRED EMBODIMENT

Figure 1:
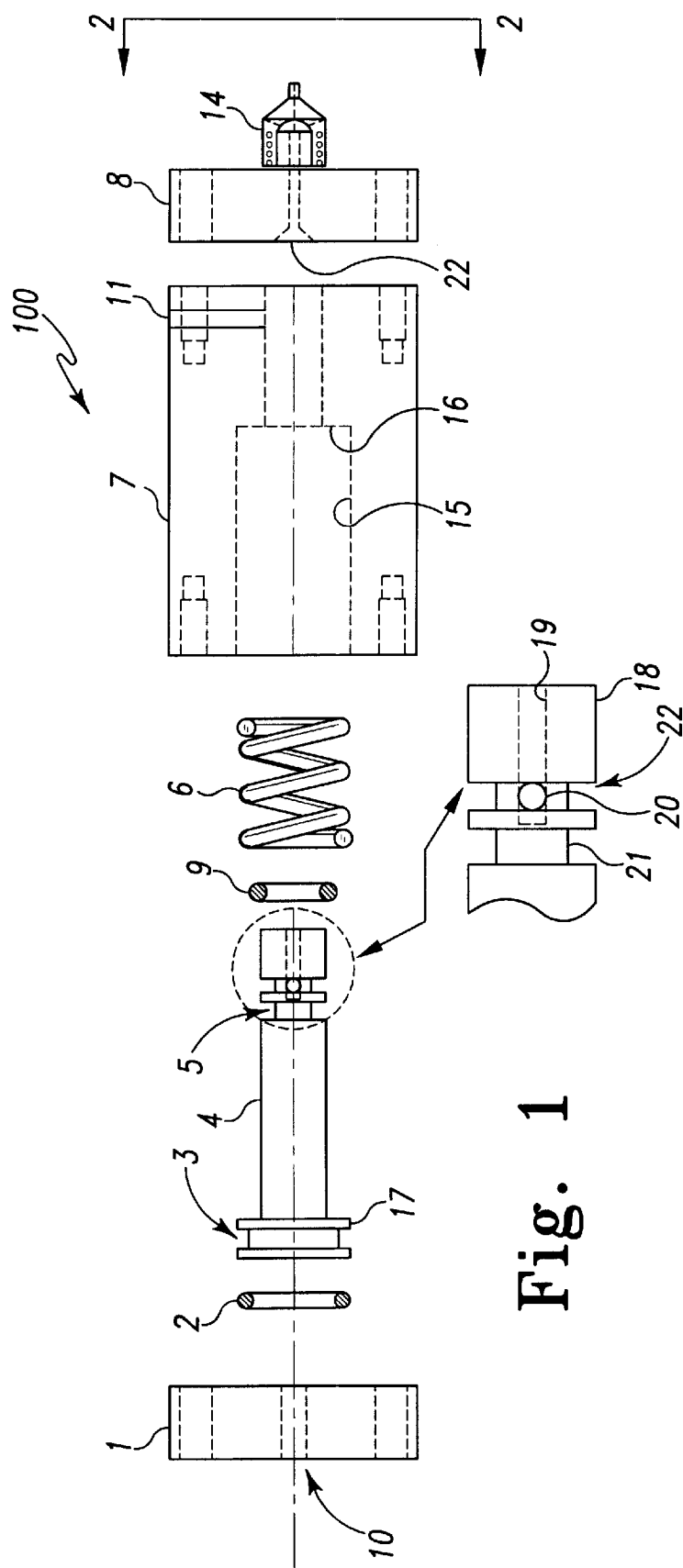
FIG. 1 is an exploded side elevational view of a preferred embodiment dispensing head of the present invention.
Figure 2:
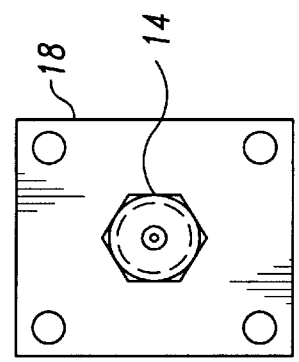
FIG. 2 is an end elevational view of the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The preferred embodiment dispensing head of the present invention is illustrated in an exploded perspective view in FIG. 1, and indicated generally at 100. The dispensing head 100 includes a housing comprising a rear cap 1, a valve body 7 and a front cap 8. The rear (distal) cap 1 and front (proximal) cap 8 are attached to the valve body 7 by means of screws or any other convenient means. The rear cap 1 includes a trigger inlet passageway 10 formed therethrough. The valve body 7 includes a central passage 15 therethrough, wherein the passageway 15 includes an annular shoulder 16 separating a first section having a first diameter and a second section having a second, smaller diameter. The valve body 7 further includes a glue inlet tube 11 which extends from an exterior surface of the valve body 7 to the interior passage 15.

Contained within the central passageway 15 is a spring 6 which is sized so as to abut the annular shoulder 16. A spool valve/piston 4 also extends through the central passageway such that a portion of the spool valve/piston 4 extends through the interior of the spring 6. The spool valve/piston 4 includes an enlarged diameter section 17 at its distal end, the section 17 including a groove 3 into which is mounted an O-ring seal 2. The dimensions of the groove 3 and O-ring 2 are chosen such that the O-ring 2 forms a sliding contact seal with the distal first section of the central passageway 15. The proximal end of the spool valve/piston 4 comprises a valve head 18 having a central valve head passageway 19 formed therein and extending to the proximal end of the spool head 18. Immediately distal of the spool head 18 is a channel (hole) 20 which is drilled into a groove 22 in the spool valve/piston 4 transverse to its longitudinal axis such that the channel 20 intersects with the passageway 19. Distal of the channel 20 is a groove 21 which carries a second O-ring 9 therein. The dimension of the groove 21 and O-ring 9 are chosen such that the O-ring 9 makes a sliding seal contact with the reduced diameter second section of the central passageway 15.

The front cap 8 is formed with a central passageway 22 formed therein which is aligned with the central passageway 19 of the spool valve head 18. The central passageway 22 further communicates with an extrusion orifice 14.

Figure 3:
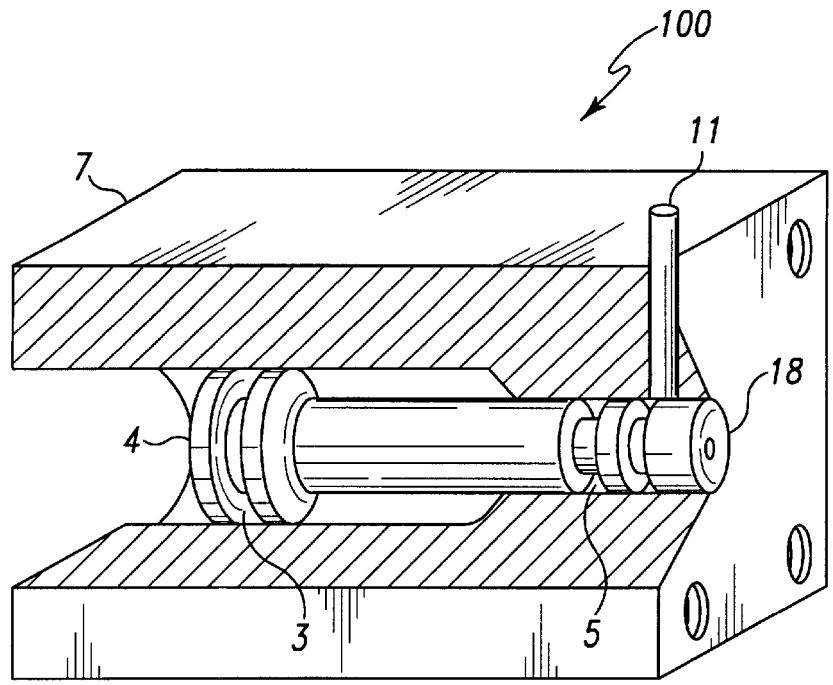
FIG. 3 is a partial cut-away perspective view of the preferred embodiment of the present invention in an open position.
Figure 4:
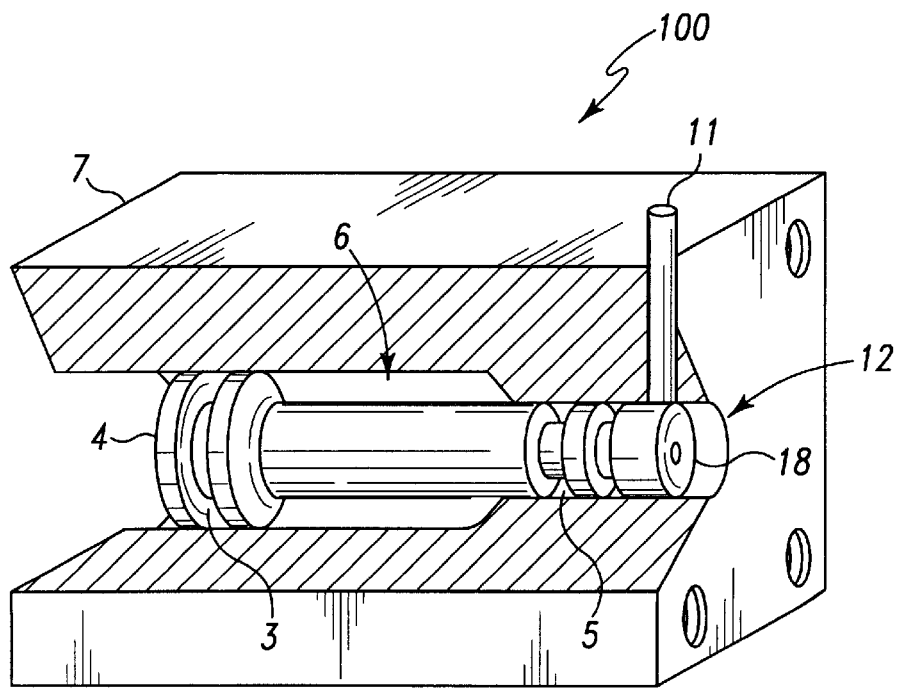
FIG. 4 is a partial cut-away perspective view of the preferred embodiment of the present invention in a closed position.

The assembled dispensing head of the present invention is illustrated in FIGS. 3 and 4, in which the O-rings 2 and 9, as well as the spring 6, have been omitted from the drawings for clarity of illustration. In the closed position illustrated in FIG. 4, the spool valve/piston 4 is moved to the distal end of the valve body 7 by the bias force exerted by the spring 6 between the spool valve/piston 4 and the annular shoulder 16, until the spool valve/piston 4 abuts the rear cap 1. In this position, the spool valve head 18 tightly covers the glue inlet tube 11, preventing any glue (which is fed to the glue inlet tube 11 under pressure) to enter the dispensing head.

As shown in FIG. 3, the dispensing head 100 is opened by application of a pressurized gas, such as air, to the trigger air inlet passageway 10 formed in the rear cap 1. Because of the seal provided between the O-ring 2 and the central passageway 15, the force from the pressurized air acts upon the distal end of the spool valve/piston 4, moving the spool valve/piston 4 in the proximal direction until the spring 6 is compressed. Once in this position, the proximal face of the spool valve head 18 is substantially aligned with the proximal face of the valve body 7, while the groove 22 is substantially aligned with the glue inlet tube 11. Because the glue supplied to the glue inlet tube 11 is under pressure, a path is formed for the flow of the glue through the tube 1, into the groove 22, into the channel 20, through the passageways 19 and 22 and out of the extrusion orifice 14. Glue will therefore continue to be omitted from the extrusion orifice 14 until air pressure is removed from the trigger air inlet 10. It will be appreciated that the seal between the O-ring 9 and the central passageway 15 prevents any of the glue from moving distal of this location.

When it is desired to stop dispensing glue, the pressurized air is removed from the trigger air inlet 10, allowing the force of the spring 6 to once again move the spool valve/piston 4 distally until it abuts the rear cap 1. This movement once again aligns the spool valve head 18 with the glue inlet 11, thereby cutting off the flow of glue through the spool valve. This same movement also operates to create a drawback cavity 12 proximal of the spool head 18. This newly created cavity 12 creates a vacuum which "sucks back" all liquid from the extrusion orifice 14, thereby removing any dispensed glue which would otherwise be available to string away from the extrusion orifice 14.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A dispensing head, comprising:

a valve body having a longitudinal body passageway formed therethrough between a distal end and a proximal end, the body passageway having a first section at the distal end having a first diameter and a second section at the proximal end having a second, smaller diameter, and an annular shoulder therebetween, the valve body further having a trigger inlet passageway at the distal end communicating with the first section;

a dispensing liquid inlet tube formed through the valve body and communicating with the second section;

a spring disposed within the body passageway first section and abutting the annular shoulder; and a spool valve/piston assembly disposed within the body passageway and extending through the spring, the spool valve/piston assembly comprising:

a spool valve head formed at a proximal end of the spool valve/piston assembly and disposed within the second section, the spool valve head including a valve head passageway formed through a central, longitudinal axis of the spool valve head;

a channel formed from an exterior surface of the spool valve/piston assembly to the valve head passageway for fluid communication therebetween;

a first seal disposed around the spool valve/piston assembly and having the second diameter, the first seal located between the spool valve head and the spring; and a second seal disposed around the spool valve/piston assembly and having the first diameter, the second seal located between the spring and the trigger inlet passageway;

wherein application of gas pressure to the trigger inlet passageway moves the spool valve/piston assembly in the proximal direction against the spring bias force, thereby aligning the channel with the dispensing liquid inlet tube, allowing dispensing liquid to enter the valve head passageway; and wherein removing the gas pressure from the trigger inlet passageway allows the spring bias force to move the spool valve/piston assembly in the distal direction, blocking the dispensing liquid inlet tube with the spool valve head and creating a cavity in the second section proximal of the spool valve head operative to suck back any dispensing liquid away from the proximal end of the valve body.

2. The dispensing head of claim 1, further comprising:

an extrusion orifice coupled to the valve body proximal end, the extrusion orifice being in fluid communication with the valve head passageway.

3. The dispensing head of claim 1, wherein the first and second seals comprise O-ring seals.

4. The dispensing head of claim 1, wherein the channel is formed substantially at a right angle to the valve head passageway.

5. The dispensing head of claim 1, wherein the dispensing liquid comprises a hot melt adhesive.

6. The dispensing head of claim 1, further comprising a source of compressed air coupled to the trigger inlet passageway.

* * * * *

UNITED STATES PATENT AND TRADEMARK OFFICE
CERTIFICATE OF CORRECTION

PATENT NO : 6,105,832
DATED : August 22, 2000
INVENTOR(S) : James L. Beck

It is certified that error appears in the above-identified patent and that said Letters Patent are hereby corrected as shown below:

On the front page of the patent, under References Cited, 5,720,433, please change "2/1998" to --8/1998--.

In column 4, line 15, please change "tube 1", to --tube 11--.

Signed and Sealed this

First Day of May, 2001

Attest:

NICHOLAS P. GODICI

*Attesting Officer*  *Acting Director of the United States Patent and Trademark Office*